(12) United States Patent
Gonzalez et al.

(10) Patent No.: US 7,154,631 B2
(45) Date of Patent: Dec. 26, 2006

(54) SYSTEM AND METHOD FOR SELECTING A PAPER SIZE FOR PRINTING AN IMAGE FILE

(75) Inventors: Manuel Gonzalez, Barcelona (ES); Luca Chiarabini, San Diego, CA (US); Steven Andrew Battle, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 909 days.

(21) Appl. No.: 09/852,263

(22) Filed: May 10, 2001

(65) Prior Publication Data
US 2002/0186382 A1 Dec. 12, 2002

(51) Int. Cl.
*G06F 15/00* (2006.01)
*H04N 1/393* (2006.01)
(52) U.S. Cl. ...................... 358/1.2; 358/451
(58) Field of Classification Search ................ 358/1.2, 358/1.9, 1.18, 296, 444, 504, 400, 401, 500, 358/501; 382/299
See application file for complete search history.

(56) References Cited

U.S. PATENT DOCUMENTS

| | | | | |
|---|---|---|---|---|
| 6,011,897 A * | 1/2000 | Koyama et al. | ............... | 386/95 |
| 6,112,010 A * | 8/2000 | Koyama et al. | ............... | 386/95 |
| 6,208,770 B1 * | 3/2001 | Gilman et al. | ............... | 382/305 |
| 6,222,949 B1 * | 4/2001 | Nakata | ........................ | 382/298 |
| 6,510,254 B1 * | 1/2003 | Nakami et al. | ............. | 382/300 |
| 6,587,221 B1 * | 7/2003 | Young | ........................ | 358/1.2 |
| 6,687,020 B1 * | 2/2004 | Hanagami et al. | ........... | 358/1.2 |

* cited by examiner

*Primary Examiner*—Jerome Grant, II

(57) ABSTRACT

The present invention provides a system and method for selecting an image size and printing a received image in the selected image size. A computer file including an image is received. A range of sizes for printing the received image is calculated based on a plurality of quality standards in order to maintain a predetermined degree of quality for a printed image. The quality standards may be related to resolution, aspect ratio, number of pixels and orientation. Also, a user may provide a custom print size for printing the received image. If the custom print size is in the calculated range of sizes, the image may printed in the custom size. Alternatively, the image is printed in a size in the range.

21 Claims, 4 Drawing Sheets

SYSTEM AND METHOD FOR SELECTING A PAPER SIZE FOR PRINTING AN IMAGE FILE

FIELD OF THE INVENTION

The present invention is generally related to printing image files. More particularly, the present invention is related to selecting an image size for printing an image file.

BACKGROUND OF THE INVENTION

There are several web sites in which Internet users can upload images for generating printed images. For example, some of these web sites allow users to upload digital photographs. The user may also receive print copies of the digital photographs. For example, the user may select from predetermined print sizes (e.g., 4×6, 5×7, and 8×10), and the web site may inform the user whether the digital photograph is adequate for the print sizes.

These web sites generally provide a limited selection of sizes for printing an image. Also, when the image is not adequate for any of these sizes, the web sites do not suggest an alternative size and the user is not provided an opportunity to suggest a custom size. Additionally, the photo resolution is generally used to determine whether a particular predetermined size is adequate for printing a photograph. Other factors, which may effect image zooming and trimming, may not be evaluated.

SUMMARY OF THE INVENTION

An aspect of the present invention is to provide a system and method for selecting a printed image size.

In one respect, the present invention provides a method comprising steps of receiving an image; calculating a range of image sizes for printing the image based on a plurality of factors; and selecting at least one of the image sizes in the range for printing the image. The plurality of factors may include one or more of image resolution (vertical and horizontal) and printer resolution (vertical and horizontal) in pixels per inch, aspect ratio and image orientation. The method further comprises steps of receiving a user-preferred image size; and determining whether the user-preferred image size is within the range. The method further comprises steps of receiving a user-preferred image size; and determining whether the user-preferred image size is within the range. The step of selecting further comprises steps of selecting the user-preferred image size for printing the image in response to the user-preferred image size being within the range; and selecting at least one of the image sizes in the range for printing the image in response to the user-preferred image size not being within the range.

In another respect, the present invention provides a method for receiving an image; calculating a range of image sizes for printing the image based on a plurality of factors; and printing the image in a size in the range. The plurality of factors may include one or more of image resolution (vertical and horizontal) and printer resolution (vertical and horizontal) in pixels per inch, aspect ratio and image orientation. The method further comprises steps of receiving a user-preferred image size; and determining whether the user-preferred image size is within the range. The step of selecting further comprises steps of printing the received image in the user-preferred image size in response to the user-preferred image size being within the range; and printing the received image in a size in the range in response to the user-preferred image size not being within the range.

The methods of the present invention may be performed by computer-executable instructions stored on a computer-readable medium.

In still another respect, the present invention includes a system comprising at least one interface operable to receive an image; a processor operable to calculate a range of sizes for printing the image based on a plurality of factors; and a printer operable to print the image in a size in the range. The plurality of factors may include one or more of image resolution (vertical and horizontal) and printer resolution (vertical and horizontal) in pixels per inch, aspect ratio and image orientation. The interface may include a network interface and/or a user input device.

In comparison to known prior art, certain embodiments of the invention are capable of achieving certain advantages, such as, improved quality for printed images and support for custom image sizes. Those skilled in the art will appreciate these and other advantages and benefits of various embodiments of the invention upon reading the following detailed description of a preferred embodiment with reference to the below-listed drawings.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
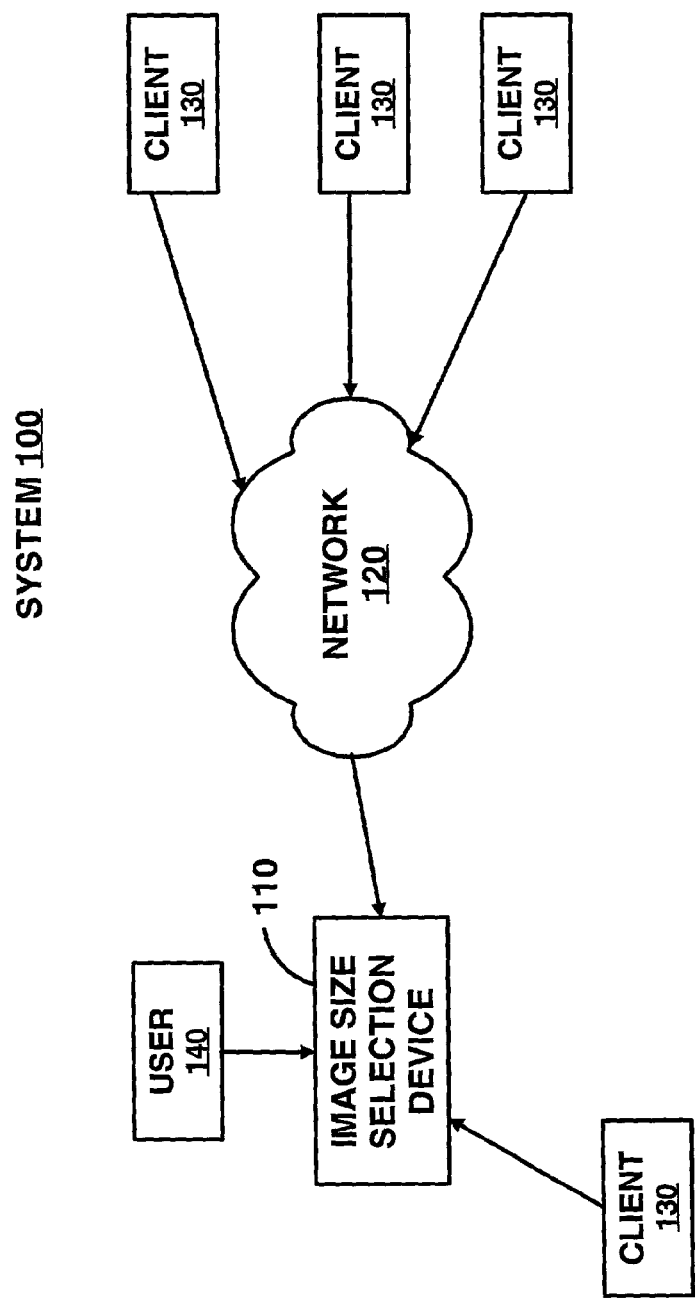
FIG. 1 illustrates an exemplary block diagram of a system employing the principles of the present invention.

FIG. 1 illustrates an embodiment of an exemplary system 100 for printing files. The system 100 includes an image-size selection device 110 connected to clients 130. The clients 130 may include conventional devices (e.g., personal computers, laptops, servers, work stations, personal digital assistants, Internet-compatible wireless devices, set-top boxes, and the like) operable to receive information form users related to printing files and to transmit the information to the device 110. The clients 130 may be connected to the device 110 via a network 120, such as the Internet, intranet, local area network (LAN), wide area network (WAN), synchronous optical network (SONET), wireless network, and the like. The clients 130 may also be directly connected to the device 110 via conventional ports and connectors. Also, the device 110 may include an interface that allows users, such as, user 140, to directly input information in the device 110.

Figure 2:
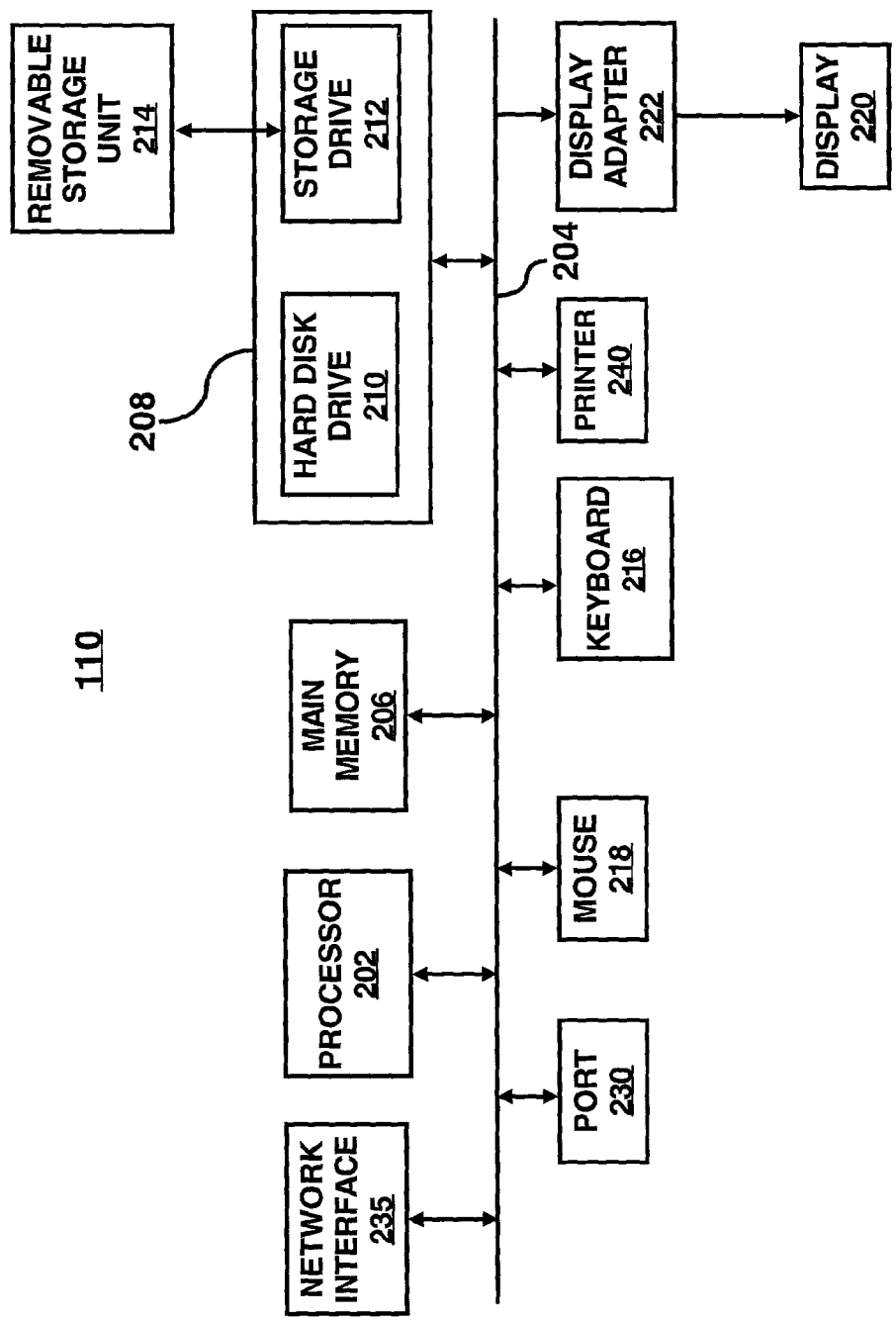
FIG. 2 illustrates an exemplary block diagram of the image-size selection device shown in FIG. 1.

FIG. 2 illustrates an exemplary block diagram of an embodiment of the device 110. The functions of the device 110 are implemented in program code and executed by one or more processors, such as a processor 202, that provides an execution platform. Commands and data from the processor 202 are communicated over one or more communication buses 204.

The device 110 also includes a main memory 206, preferably Random Access Memory (RAM), where the software for the device 110 maybe executed and a secondary memory 208. The secondary memory 208 includes, for example, a hard disk drive 210 and/or a storage drive 212, representing a floppy diskette drive, a magnetic tape drive, a compact disk drive, and the like. A copy of software for the device 110 may be stored in drive 210 or 212. The storage drive 212 reads from and/or writes to a removable storage unit 214 in a manner known to those of ordinary skill in the art.

The user 140 may interface directly with the device 110 with an input device, such as keyboard 216, a mouse 218, and a display 220. A display adaptor 222 interfaces with the communication bus 204 to receive display data from the processor 202 and converts the display data into display commands for the display 220. Device 110 may also include one or more conventional ports 230 and conventional network interfaces 235 for receiving information from the clients 130 connected thereto.

The device 110 may also include one or more printers 240 for printing received files. The printer 240 may include various types of known printers operable to print images, graphics and text. The device 110 may be incorporated into a web site or in a kiosk accessible by users, such as the user 140. Also, instead of being connected to the printer 240, the device 110 may be incorporated into a printer.

Figure 3:
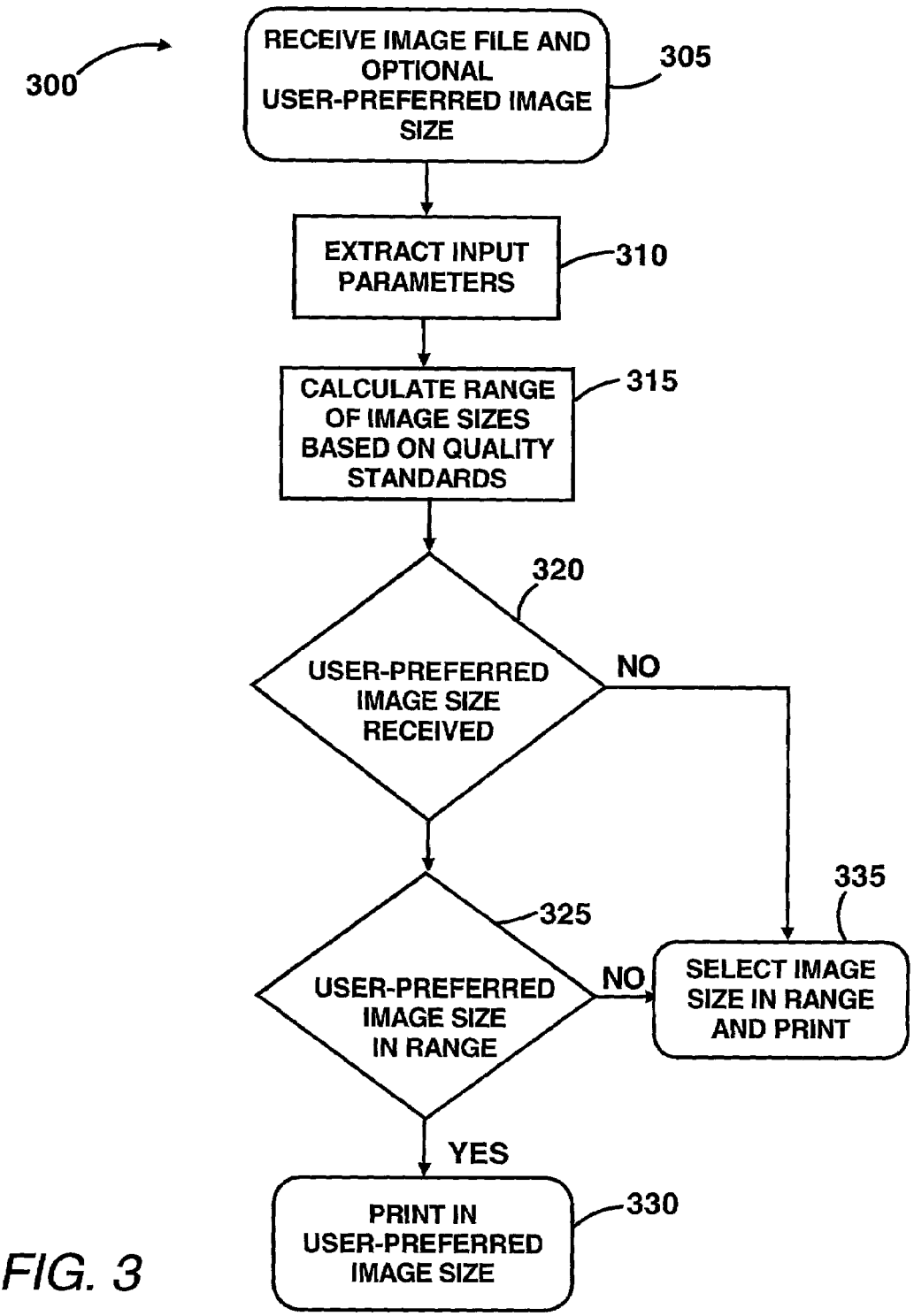
FIG. 3 illustrates an exemplary method employing the principles of the present invention.

The device 110 receives input parameters related to an image file to be printed and calculates a range of image sizes for printing the image. The range of image sizes are calculated, such that an image printed to a size in the range meets predetermined quality standards. Generally, the quality of the electronic image in the image file affects the amount of scaling which may be performed for printing the electronic image. Additionally, according to a preferred embodiment of the present invention, the range of image sizes are calculated for printing onto relatively large print media, e.g., A3 size print medium and larger. FIG. 3 illustrates an exemplary method 300 for determining a range of image sizes for printing an image, according to an embodiment of the present invention.

In step 305, the device 110 receives an image file to be printed and optionally a user-preferred image size. In step 310, the device 110 extracts input parameters from the image file. For example, the device 110 extracts number of lines in the image, number of pixels per line, number of bits per pixel, pixel aspect ratio, and the like, from the image file's header and/or footer. Alternatively, input parameters may be input by a user and received by the device 110. The device 110 may accept image files in a variety of conventional formats, such as JPEG, PHOTOCD, PDF and the like.

In step 315, a range of image sizes is calculated based on quality standards. The quality standards are associated with the number of pixels, the resolution of the printer and the image, the aspect ratio and the orientation of the image from the image file. These factors are described in greater detail below with respect to FIG. 4. It will be apparent to one of ordinary skill in the art that the quality standards may be related to other factors associated with printed image quality. Images printed in sizes in the range are of a predetermined quality that meets the quality standards.

In step 320, the device 110 determines whether a user-preferred image size was received. The user-preferred image size may include a paper size for the size of the printed image. The paper size may be a standard paper size or a custom paper size. In step 325, if a user-preferred image size was received, the device 110 determines whether the user-preferred image size is included in the calculated range. If the user-selected image size is included in the calculated range, the user may be notified that the user-preferred image size is adequate for printing the received image, and the received image may be printed in the user-selected image size (330).

If a user-preferred image size was not received, as determined in step 320, the user may be notified of the calculated ranges (step 335). Then, the user may select an image size within the range for printing the received image.

If a user-preferred image size is not in the calculated range, as determined in step 325, the device 110 may perform step 335.

Figure 4:
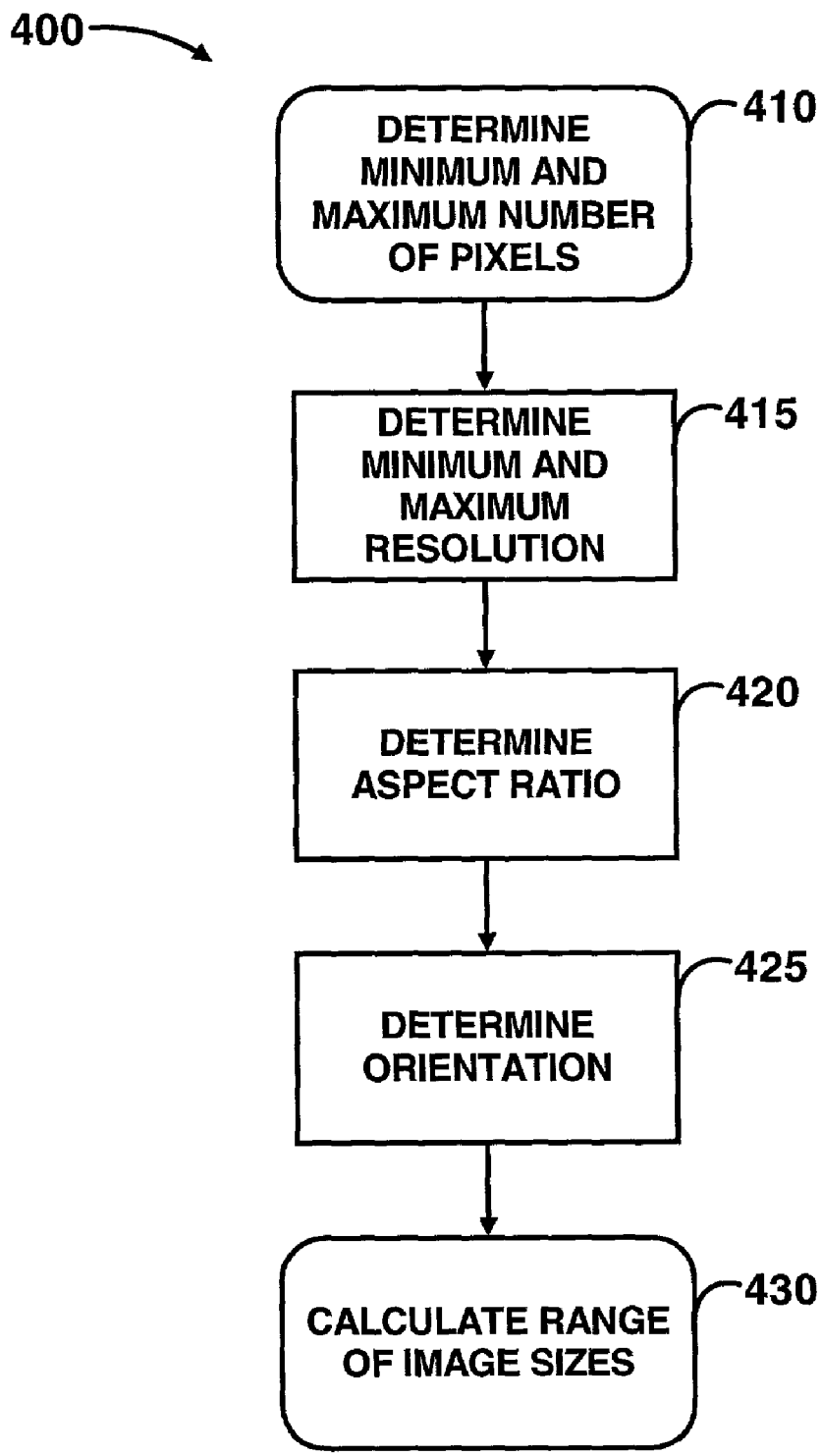
FIG. 4 illustrates an exemplary method for selecting an image size.

FIG. 4 illustrates an exemplary method 400 for calculating a range of image sizes based on the quality standards, such as performed in step 315 in the method 300, according to an embodiment of the present invention.

In step 410, the device 110 determines a minimum and maximum number of pixels that may be used in the printed image. The minimum number of pixels may be based on a predetermined minimum number of pixels per inch (e.g., 75–150 pixels per inch (horizontal and vertical) of the printed image) of a printed image needed to maintain a predetermined degree of quality for the printed image. The maximum number of pixels may be based on a predetermined maximum number of pixels per inch (e.g., 300, 600 or 1200 pixels per inch of the printed image).

In step 415, the device 110 determines the minimum and maximum resolution for the printed image. The resolution is related to the sharpness and clarity of the printed image. The minimum and maximum resolution is a function of the resolution of the printer (e.g., in dots per inch (DPI)) that will print the image and a function of the resolution of the image from the image file. If the image is printed by printer 240 connected to the device 120, the resolution of the printer 240 may be stored in the memory 310. Alternatively, the resolution of the printer printing the image may be input by a user and received with the image file. The resolution of the image from the image file may be determined from the input parameters. The device 110 may then correlate the resolution of the image from the image file and the resolution of the printer to determine the maximum and minimum resolutions for the printed image.

Correlation may include determining print resolutions based on the image resolution and the printer resolution. For example, the resolution of the image from the image file may be satisfactory as determined in step 410 (e.g., 100 DPI), but the printer resolution may be high (e.g., 600 DPI). In this case, a greater image resolution may be necessary. A table may be created including a range of suitable image resolutions for particular print resolutions.

Table 1 below illustrates an exemplary table for correlating the image resolution and the printer resolution. Table 1 includes four columns. Column A defines the type of image to be printed, i.e., photo image and line/text image. Column B is a printer resolution for multiple standard printers. Columns B and C include the minimum and maximum image resolutions, respectively, that are needed according to each printer resolution in Column A. The resolution of the image from the image file should be greater than or equal to the minimum image resolution in Column B and less than or equal to the maximum image resolution in Column C for the appropriate printer resolution. It will be apparent to one of ordinary skill in the art that the values in Table 1 may vary according to the desired quality for a printed image and other known factors.

TABLE 1

| Column A<br>Image Type | Column B<br>Printer Resolution | Column C<br>Minimum<br>Resolution<br>Threshold | Column D<br>Maximum<br>Resolution<br>Threshold |
|---|---|---|---|
| Photo image | 300 DPI | 75 DPI | 200 DPI |
|  | 600 DPI | 150 DPI | 200 DPI |
|  | 1200 DPI | 200 DPI | 200 DIP |
| Line/Text image | 300 DPI | 150 DPI | 300 DPI |
|  | 600 DPI | 300 DPI | 600 DPI |
|  | 1200 DPI | 300 DPI | 600 DPI |

In step 420, the aspect ratio of the image from the image file is determined (e.g., received as an input parameter). A range of printed image sizes is calculated based on the aspect ratio of the image from the image file. Aspect ratio is the ratio of the image width to height. For example, the aspect ratio of a 1500×2100 pixel image is 5:7 When resizing the image, it is important to maintain the aspect ratio to avoid distorting the image. An image printed in any of the image sizes in the range generally maintains the aspect ratio of the image from the image file.

In step 425, the orientation (e.g., landscape or portrait) is determined for the images in the range of printed image sizes. The orientation of the image from the image file is determined by the device 110 (e.g., received as an input parameter). The orientation of the printed image should match the orientation of the image from the image file.

In step 430, the range of image sizes for the printed image is calculated based on the minimum and maximum number of pixels, the correlated image and printer resolutions, the aspect ratio and the orientation determined in steps 410–425. For example, the lower limit in the range includes a printed image that has the minimum number of pixels and the minimum resolution. The upper limit in the range includes a printed image that has the maximum number of pixels and the maximum resolution. All the image sizes in the range include the aspect ratio and orientation determined in steps 410 and 425.

It will be apparent to one of ordinary skill in the art that the steps 410–425 in the method 400 may be performed in any order or simultaneously. Also, the present invention has generally been described with respect to printing image files. However, it will be apparent to one of ordinary skill in the art the present invention is applicable for printing, images, text, graphics and the like. Also, the method 400 uses two thresholds (i.e., a minimum and a maximum for the quality standards). It will be apparent to one of ordinary skill in the art that more than two thresholds may be used. For example, a third threshold within the minimum and maximum thresholds may be provided. When the third threshold is reached, the user may be warned of possible impediments to the quality of the printed image if an image size is chosen that may cause a quality standard to be outside the threshold.

The methods shown in FIGS. 3 and 4 and described above may be performed by a computer program. The computer program may exist in a variety of forms both active and inactive. For example, the computer program may exist as software comprised of program instructions or statements in source code, object code, executable code or other formats; firmware program(s); or hardware description language (HDL) files. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program may be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A method for selecting a printed image size comprising steps of:

receiving an image;

calculating a range of image sizes for printing said image based on a plurality of factors, wherein the calculating comprises:

determining a resolution of said received image;

determining a resolution of a printer printing said image; and correlating said resolution of said received image and said printer; and selecting at least one of said image sizes in said range for printing said image, wherein the selecting chooses an image in the range having a resolution associated with the correlated resolution.

2. The method of claim 1, further comprising steps of:

receiving a user-preferred image size; and determining whether said user-preferred image size is within said range.

3. The method of claim 2, wherein said step of selecting further comprises steps of:

selecting said user-preferred image size for printing said image in response to said user-preferred image size being within said range; and selecting said at least one of said image sizes in said range for printing said image in response to said user-preferred image size falling outside of said range.

4. The method of claim 1, wherein said step of calculating further comprises steps of:

determining an aspect ratio of said image; and calculating said range, whereby an image printed in each of said sizes in said range has an aspect ratio approximately equal to an aspect ratio of said received image.

5. The method of claim 4, additionally comprising:

determining an orientation of said received image;

wherein the selected image is printed in said orientation of said received image.

6. The method of claim 5, wherein said step of calculating further comprises a step of calculating said sizes in said range, whereby an image printed in each of said sizes in said range has a number of pixels that is greater than a predetermined minimum number of pixels and less than a predetermined maximum number of pixels.

7. The method of claim 1, additionally comprising:
determining an orientation of said received image; and
printing the selected image in the orientation of said received image, wherein the orientation is one of landscape and portrait.

8. The method of claim 1, wherein said plurality of factors includes one or more of resolution, aspect ratio, number of pixels per inch of a printed image, and image orientation.

9. The method of claim 1, wherein said steps in said method are performed by a program stored in a computer readable medium.

10. The method of claim 1, wherein said calculating step further includes a step of calculating a range of image sizes for printing said image on at least A3 sized paper medium.

11. A method for printing an image comprising steps of:
receiving an image;
calculating a range of image sizes for printing said image based on a plurality of factors wherein the calculating comprises:
determining a resolution of said received image;
determining a resolution of a printer printing said image; and
correlating said resolution of said received image and said printer;
determining an aspect ratio of said image, wherein the range allows an image to be printed in any of said sizes in said range having an aspect ratio approximately equal to an aspect ratio of said received image; and
printing said image in a size in said range.

12. The method of claim 11, further comprising steps of:
receiving a user-preferred image size; and
determining whether said user-preferred image size is within said range.

13. The method of claim 12, wherein said step of printing comprises steps of;
printing said received image in said user-preferred image size in response to said user-preferred image size being within said range; and
printing said received image in a size in said range in response to said user-preferred image size falling outside of said range.

14. The method of claim 11, wherein said plurality of factors includes one or more of resolution, aspect ratio, number of pixels per inch of a printed image, and image orientation.

15. The method of claim 11, wherein said printing step comprises a step of printing said image on at least A3 size print medium.

16. A system operable to select an image size for printing an image, said system comprising:
at least one interface operable to receive said image;
a processor operable to calculate a range of sizes for printing said image based on a plurality of factors, wherein said plurality of factors includes resolution and aspect ratio;
wherein said processor is additionally operable for:
determining a resolution of said received image;
determining a resolution of a printer printing said image;
correlating said resolution of said received image and said printer;
receiving a user-preferred image size;
determining whether said user-preferred image size is within said range;
selecting said user-preferred image size for printing said image in response to said user-preferred image size being within said range; and
selecting said at least one of said image sizes in said range for printing said image in response to said user-preferred image size falling outside of said range; and
a printer operable to print said image in a size in said range.

17. The system of claim 16, wherein said processor is further operable to calculate a range of image sizes for printing said image based on a plurality of factors and select at least one of said image sizes in said range for printing said image on said printer.

18. The system of claim 17, wherein said at least one interface is further operable to receive a user-preferred image size, and said processor is further operable to determine whether said user-preferred image size is within said range.

19. The system of claim 18, wherein said processor is further operable to select said user-preferred image size for printing said image on said printer in response to said user-preferred image size being within said range, and said processor is further operable to select at least one of said image sizes in said range for printing said image in response to said user-preferred image size falling outside of said range.

20. The system of claim 19, wherein said interface includes a network interface.

21. The system of claim 20, wherein said interface includes a user input device.

* * * * *

UNITED STATES PATENT AND TRADEMARK OFFICE
CERTIFICATE OF CORRECTION

PATENT NO. : 7,154,631 B2  Page 1 of 1
APPLICATION NO. : 09/852263
DATED : December 26, 2006
INVENTOR(S) : Manuel Gonzalez et al.

It is certified that error appears in the above-identified patent and that said Letters Patent is hereby corrected as shown below:

In column 6, line 31, in Claim 1, delete "detennining" and insert -- determining --, therefor.

In column 7, line 35, in Claim 13, delete "of;" and insert -- of: --, therefor.

Signed and Sealed this

Eleventh Day of November, 2008

JON W. DUDAS
*Director of the United States Patent and Trademark Office*